(12) United States Patent
Fludger et al.

(10) Patent No.: US 9,584,260 B2
(45) Date of Patent: Feb. 28, 2017

(54) OPTIMIZATION OF OPTICAL TRANSMISSION CAPACITY

(71) Applicant: Cisco Technology, Inc., San Jose, CA (US)

(72) Inventors: Chris Fludger, Nuremberg (DE); Theodor Kupfer, Feucht (DE); Fabrizio Forghieri, Monza (IT); Pierluigi Poggiolini, Turin (IT); Gabriella Bosco, Bollengo (IT); Andrea Carena, Carmagnola (IT); Vittorio Curri, Nomaglio (IT)

(73) Assignee: Cisco Technology, Inc., San Jose, CA (US)

( * ) Notice: Subject to any disclaimer, the term of this patent is extended or adjusted under 35 U.S.C. 154(b) by 322 days.

(21) Appl. No.: 14/198,867

(22) Filed: Mar. 6, 2014

(65) Prior Publication Data

US 2016/0142179 A1    May 19, 2016

(51) Int. Cl.
| | | |
|---|---|---|
| *H04L 1/00* | (2006.01) |
| *H04J 14/06* | (2006.01) |
| *H04B 10/556* | (2013.01) |
| *H04B 10/2513* | (2013.01) |
| *H04B 10/516* | (2013.01) |
| *H04B 10/54* | (2013.01) |

(Continued)

(52) U.S. Cl.
CPC ....... *H04L 1/0042* (2013.01); *H04B 10/2569* (2013.01); *H04B 10/25137* (2013.01); *H04B 10/5161* (2013.01); *H04B 10/541* (2013.01); *H04B 10/61* (2013.01); *H04B 10/614* (2013.01); *H04B 10/616* (2013.01); *H04J 14/06* (2013.01)

(58) Field of Classification Search
CPC ............ H04B 10/2513; H04B 10/2569; H04B 10/516
USPC ..................................................... 398/185, 65
See application file for complete search history.

(56) References Cited

U.S. PATENT DOCUMENTS

| | | | | |
|---|---|---|---|---|
| 8,660,425 B2 * | 2/2014 | Aoki | ................. | H04B 10/5161 398/137 |
| 8,909,061 B1 * | 12/2014 | Varadarajan | ....... | H04B 10/6161 398/159 |
| 9,071,364 B1 * | 6/2015 | Voois | ..................... | H04B 10/58 |

(Continued)

OTHER PUBLICATIONS

Lidon, Maria, "Digital Pre-Compensation of Chromatic Dispersion in QPSK high speed telecom systems", Dec. 2011, 52 pages.

(Continued)

*Primary Examiner* — Oommen Jacob
(74) *Attorney, Agent, or Firm* — Edell, Shapiro & Finnan, LLC

(57) ABSTRACT

A method for transmitting a coherent optical data signal includes receiving a data signal from an interface, and encoding the data signal with a forward error correcting (FEC) encoder according to a mix of modulation formats. The FEC encoder generates an FEC encoded signal which is used to generate modulation symbols according to the modulation formats. The FEC encoded signal of modulation symbols is spectrally shaped to generate a shaped signal, and pre-distorted before transmission. The shaped signal is pre-distorted by adding a predetermined amount of chromatic dispersion to generate a smoothed signal, and the smoothed signal is transmitted according to the modulation formats.

22 Claims, 8 Drawing Sheets

(51) Int. Cl.
*H04B 10/61* (2013.01)
*H04B 10/2569* (2013.01)

(56) References Cited

U.S. PATENT DOCUMENTS

| | | | | |
|---|---|---|---|---|
| 9,094,132 | B1* | 7/2015 | Thesling | H04B 10/60 |
| 9,337,934 | B1* | 5/2016 | Agazzi | H04B 10/40 |
| 2009/0252501 | A1* | 10/2009 | Eiselt | H04B 10/5053 398/185 |
| 2010/0146363 | A1* | 6/2010 | Birru | H04L 1/0043 714/752 |
| 2011/0293266 | A1 | 12/2011 | Aoki | |
| 2012/0257896 | A1* | 10/2012 | Djordjevic | H04B 10/548 398/65 |
| 2013/0148965 | A1 | 6/2013 | Losio et al. | |
| 2014/0029957 | A1* | 1/2014 | Sethumadhavan | H04B 10/588 398/192 |
| 2014/0079394 | A1* | 3/2014 | Xie | H04B 10/5053 398/65 |
| 2015/0078739 | A1* | 3/2015 | Handelman | H04B 10/032 398/2 |
| 2015/0086193 | A1* | 3/2015 | Liu | H04B 10/2543 398/28 |
| 2015/0270904 | A1* | 9/2015 | Jiang | H04B 10/506 398/79 |
| 2016/0028487 | A1* | 1/2016 | Kan | H04B 10/40 398/136 |
| 2016/0065325 | A1* | 3/2016 | Cavaliere | H04B 10/5161 398/65 |
| 2016/0142179 | A1* | 5/2016 | Fludger | H04B 10/25137 398/65 |

OTHER PUBLICATIONS

Rios-Muller et al., "Experimental Comparison between Hybrid-QPSK/8QAM and 4D-32SP-16QAM Formats at 31.2 GBaud using Nyquist Pulse Shaping", Sep. 2013, 3 pages.
Zhou et al., "High Spectral Efficiency 400 Gb/s Transmission Using PDM Time-Domain Hybrid 32-64 QAM and Training-Assisted Carrier Recovery", Journal of Lightwave Technology, vol. 31, No. 7, Apr. 1, 2013, pp. 999-1005.
Zhuge et al., "Time Domain Hybrid QAM Based Rate-Adaptive Optical Transmissions Using High Speed DACs", OFC/NFOEC Technical Digest, 2013, 3 pages.
Fischer et al., "Bandwidth-Variable Transceivers based on Four-Dimensional Modulation Formats", Journal of Lightwave Technology, vol. 32, No. 16, Aug. 15, 2014, pp. 2886-2895.
Freude et al., "Reconfigurable Optical Transmitters and Receivers", Next-Generation Optical Communication: Components, Sub-Systems, and Systems, SPIE, vol. 8284, No. 1, Jan. 21, 2012, pp. 1-8.
Zhuge et al., "Spectral Efficiency-Adaptive Optical Transmission Using Time Domain Hybrid QAM for Agile Optical Networks", Journal of Lightwave Technology, vol. 31, No. 15, Aug. 1, 2013, pp. 2621-2628.
International Search Report and Written Opinion in counterpart International Application No. PCT/US2015/018715, mailed May 20, 2015, 13 pages.

* cited by examiner

OPTIMIZATION OF OPTICAL TRANSMISSION CAPACITY

TECHNICAL FIELD

The present disclosure relates to coherent optical data reception and decoding.

BACKGROUND

The evolution of optical networks has moved toward maximum time-flexibility, such that transceivers are able to maximize spectral efficiency (SE) by adapting to the actual conditions of the network and data rate for the current traffic demand. To simplify transceiver implementation, the channel spectral allocation $\Delta f$ and symbol rate $R_s$ may be kept as constants. The use of a standard modulation format with fixed bit-per-symbol (BpS) results in fixed increments of SE, since $SE = BpS \cdot \Delta f / R_s$.

The reach of a coherent optical transmission system may be further limited by nonlinearity in the optical fiber path generated by both the optical channel itself, and by other channels at different optical wavelengths. In a polarization multiplexed transmission, the nonlinearities may also be due to intensity fluctuations in the orthogonal polarization.

DESCRIPTION OF EXAMPLE EMBODIMENTS

Overview

A method for transmitting a coherent optical data signal comprises receiving a data signal from an interface, and encoding the data signal with a forward error correcting (FEC) encoder according to a plurality of modulation formats. The FEC encoder generates an FEC encoded signal which is used to generate a plurality of symbols according to the plurality of modulation formats. The plurality of symbols are spectrally shaped to generate a shaped signal. The shaped signal is pre-distorted by adding a predetermined amount of chromatic dispersion to generate a smoothed signal, and the smoothed signal is transmitted according to the plurality of modulation formats.

Example Embodiments

Figure 1:
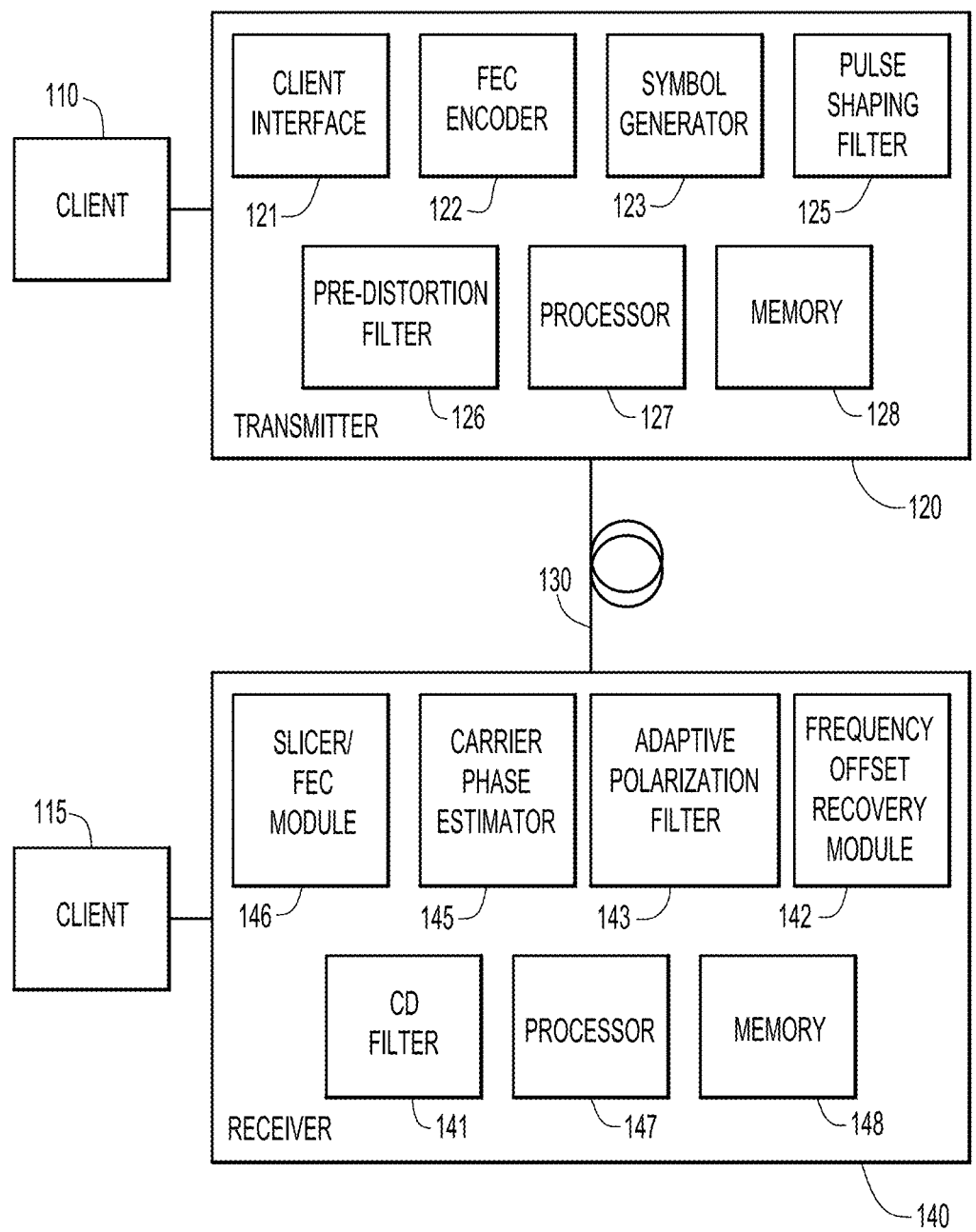
FIG. 1 is a block diagram of an example embodiment of a system configured according to the techniques presented herein.

Referring to FIG. 1, a coherent optical transmission system 100 is shown that enables client 110 to send data to client 115. Client 110 sends a data stream to a coherent transmitter 120 through client interface 121. Coherent transmitter 120 also includes a Forward Error Correction (FEC) encoder 122, symbol generator 123, pulse shaping filter 125, pre-distortion filter 126, processor 127, and memory 128. After processing the data stream and encoding it, transmitter 120 sends the data via optical path 130 (e.g., a fiber optic cable) to receiver 140. Receiver 140 includes a chromatic dispersion filter 141, a frequency offset recovery module 142, an adaptive polarization filter 143, a carrier phase estimator 145, a data slicer/FEC module 146, a processor 147, and memory 148. Only two client devices are shown for simplicity, but any number of client devices may connect to transmitter 120 and/or receiver 140. Additionally, transmitter 120 and receiver 140 may each comprise a transceiver with components from both transmitter 120 and receiver 140 to enable two-way communication over the same or a different optical path.

In one example, the functions of at least some of the modules in the transmitter 120 (e.g., the client interface 121, FEC encoder 122, symbol generator 123, pulse shaping filter 125, or pre-distortion filter 126) may be performed by processor 127 executing computer readable instructions stored in memory 128. Memory 128 may comprise read only memory (ROM), random access memory (RAM), magnetic disk storage media devices, optical storage media devices, flash memory devices, electrical, optical, or other physical/tangible (e.g., non-transitory) memory storage devices. The processor 127 may be, for example, a microprocessor or microcontroller that executes instructions for implementing the processes described herein. Thus, in general, the memory 128 may comprise one or more tangible (non-transitory) computer readable storage media (e.g., a memory device) encoded with software comprising computer executable instructions and when the software is executed (by the processor 127) it is operable to perform the operations described herein. Alternatively, at least some of the modules may be embodied in application-specific integrated circuits (ASICs) designed to perform the function of at least one module described herein. In one example, a single ASIC may perform the functions of more than one module, e.g., the pulse shaping filter 125 and the pre-distortion filter 126 may comprise a single ASIC.

In one example, the functions of at least some of the modules in the receiver 140 (e.g., the CD filter 141, frequency offset recovery module 142, adaptive polarization filter 143, carrier phase estimator 145, and/or slicer FEC decoder 146) may be performed by processor 147 executing computer readable instructions stored in memory 148. Memory 147 may comprise read only memory (ROM), random access memory (RAM), magnetic disk storage media devices, optical storage media devices, flash memory devices, electrical, optical, or other physical/tangible (e.g., non-transitory) memory storage devices. The processor 147 may be, for example, a microprocessor or microcontroller that executes instructions for implementing the processes described herein. Thus, in general, the memory 148 may comprise one or more tangible (non-transitory) computer readable storage media (e.g., a memory device) encoded with software comprising computer executable instructions and when the software is executed (by the processor 147) it is operable to perform the operations described herein.

Each of the modules in the transmitter 120 may comprise a plurality of modules that perform the function of the module on separate data streams. In one example, the data stream from the client 110 is separated into a first data stream and a second data stream, which are processed in parallel by FEC encoder 122, symbol generator 123, pulse shaping filter 125, and pre-distortion filter 126. The first data stream and second data stream may then be multiplexed across two orthogonal polarization modes before transmission across optical path 130. Similarly, the modules of the receiver 140 may comprise a plurality of modules that perform the function of the module on separate data streams (e.g., a stream received with x-polarization and a stream received with y-polarization), as described further hereinafter.

Figure 2:
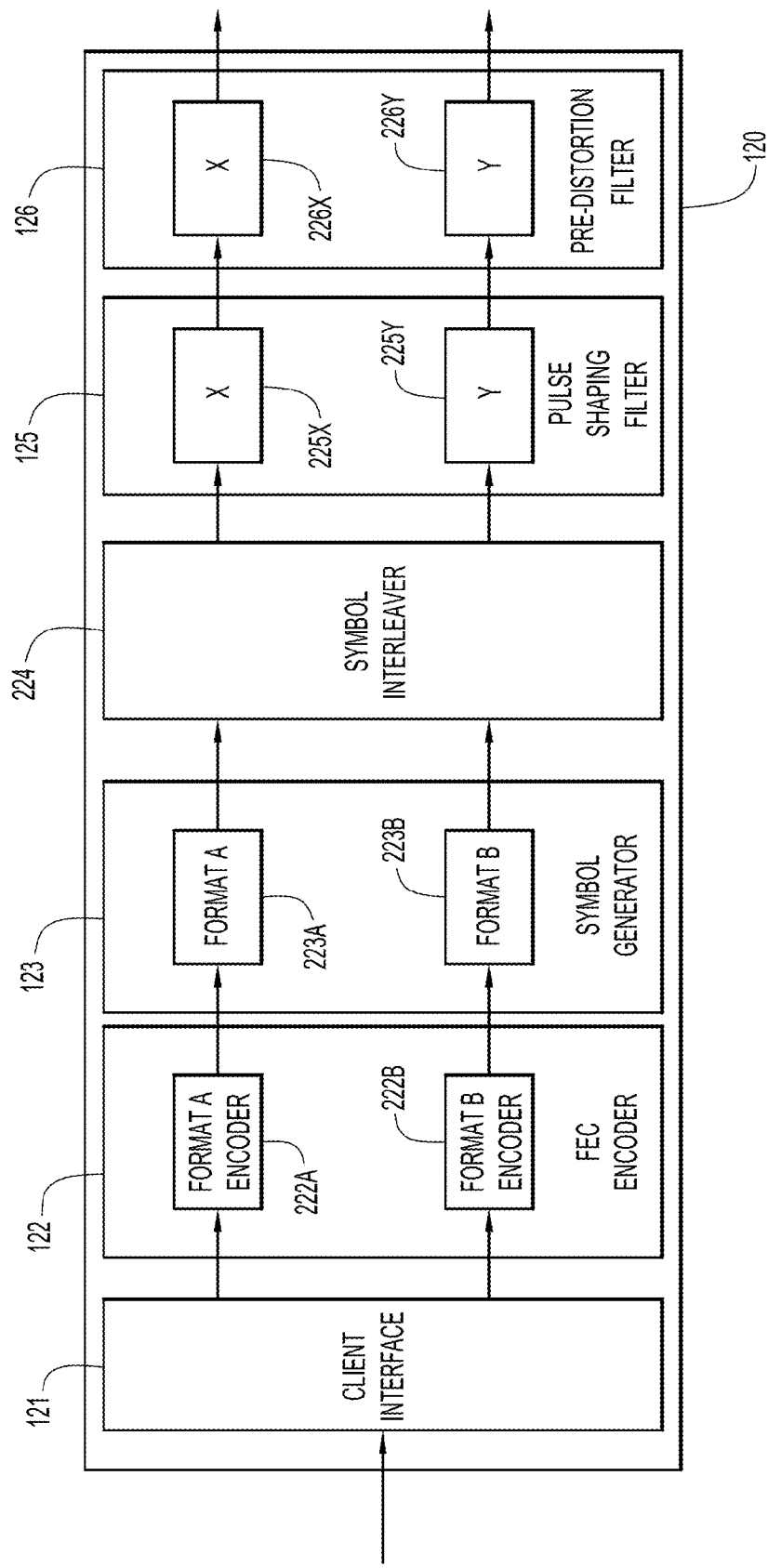
FIG. 2 is a block diagram of an example embodiment of an electrical front end of a transmitter with an interleaver for polarization interleaving according to the techniques presented herein.

Referring now to FIG. 2, a simplified block diagram of transmitter 120 is shown. In this example, the client interface 121 separates the data stream from the client into two separate data paths. FEC encoder 122 comprises an encoder 222A for encoding one of the data streams with FEC according to modulation format A, and encoder 222B for encoding the second data stream with FEC according to modulation format B. Symbol generator 123 comprises a symbol generator 223A for generating symbols according to format A, and symbol generator 223B for generating symbols according to format B. Symbol interleaver 224 receives the symbols in both formats and interleaves the symbols, such that each output data streams comprises some symbols in format A and some symbols in format B. In this example, signal shaping filter 125 comprises an x-polarization filter 225X for generating a signal with x-polarization, and y-polarization filter 225Y for generating a signal with y-polarization. The modules of pulse shaping filter 125 may also filter the signal to more closely match a Nyquist spectral shape. The pre-distortion filter 126 may add a predetermined amount of chromatic distortion to pre-distort one or both polarization signals through modules 226X and 226Y. This pre-distortion results in a reduction in the non-linear distortion in the optical fiber. These two signals with x-polarization and y-polarization, respectively, are transmitted through optical path 130 to receiver 140. Each of these signals x-polarization and y-polarization may be transmitted as a combination of in-phase and quadrature signals.

In one example, modulation formats A and B may be phase shift keying (e.g. binary phase shift keying (BPSK), quadrature phase shift keying (QPSK)) or quadrature amplitude modulation (QAM) formats (e.g., 8-QAM, 16-QAM, etc.). Each of these formats has a given BpS and combining different formats allows the transmitter 120 to achieve a BpS anywhere in between the given BpS of each format. For example, by mixing one symbol of QPSK (BpS of 2 bits per symbol) modulated data with one symbol of 16-QAM (BpS of 4 bits per symbol), the transmitter can achieve a Bps of 3 bits per symbol for the hybrid modulation format. The transmitter 120 may include an unequal ratio of symbols from each format to achieve a fractional BpS. Additionally, the transmitter 120 may interleave multiple consecutive symbols of each format for simpler operations in other modules. For example, some portion of the data processing may proceed more efficiently with sixteen consecutive symbol blocks, and the transmitter 120 may interleave sixteen consecutive symbols of QPSK with sixteen consecutive symbols of 16-QAM.

Figure 3:
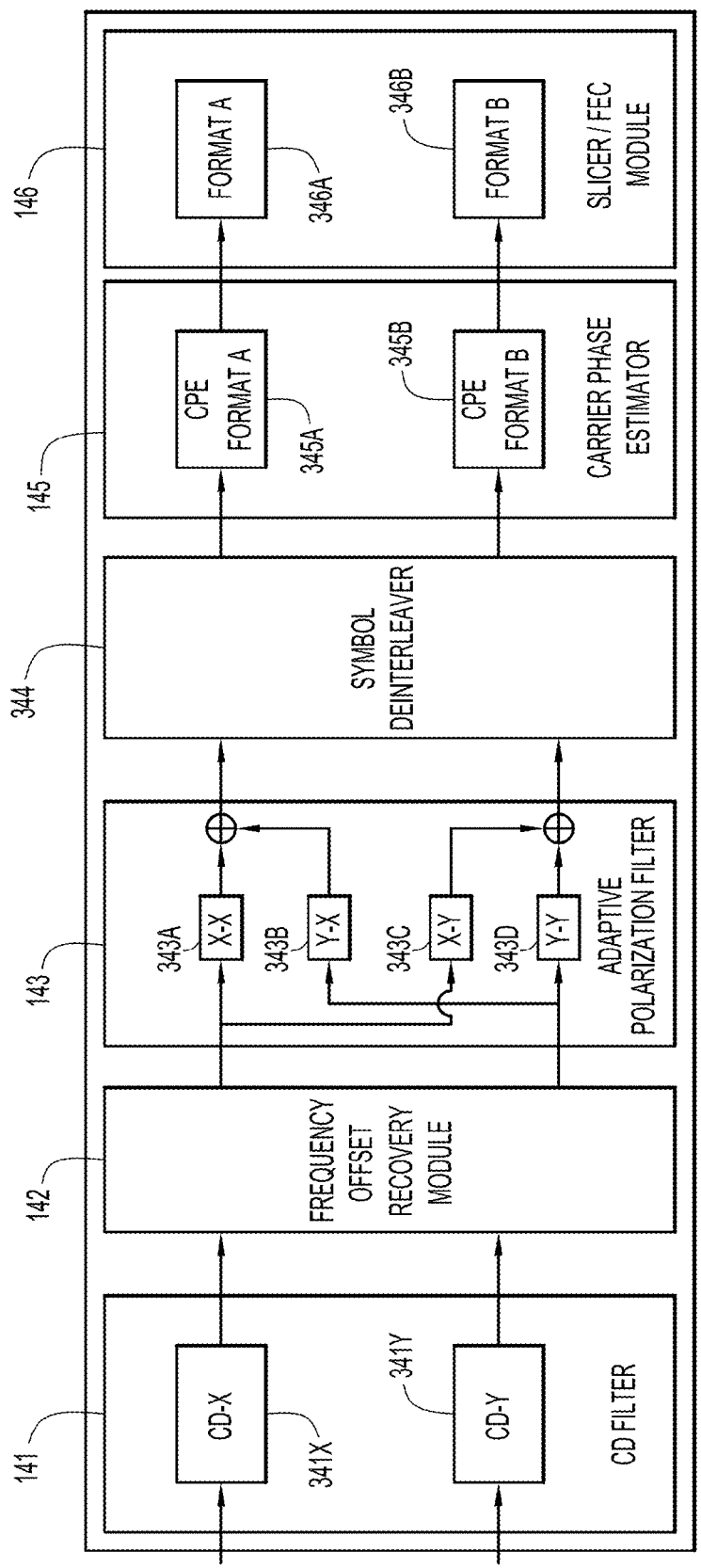
FIG. 3 is a block diagram of an example embodiment of a coherent receiver with a de-interleaver for recovering the polarization interleaved signal according to the techniques presented herein.

Referring now to FIG. 3, a simplified block diagram of receiver 140 is shown. In this example, CD filter 141 processes the x-polarization signal with CD filter 341X and processes the y-polarization signal with CD filter 341Y. After the frequency offset module 142 has recovered the carrier frequency of the signals, adaptive polarization filter 143 demultiplexes the two polarization modes, compensates for polarization mode dispersion (PMD) from the signals, adapts to changes in the polarization multiplexing and PMD, and compensates for residual inter-symbol interference caused by filtering and/or channel pulse shaping. Adaptive polarization filter 143 comprises modules 343A, 343B, 343C, and 343D in a butterfly configuration. After adaptive polarization filter 143 has processed the signals, symbol de-interleaver 344 sorts the symbols of modulation format A and modulation format B, and restores the data signals so that one data signal is entirely modulation format A, and the other data signal is entirely modulation format B.

The carrier phase estimator 145 estimates the carrier phase for the data signal in modulation format A with module 345A, and estimates the carrier phase for the data signal in modulation format B with module 345B. Slicer/FEC decoder 146 comprises module 346A and module 346B and decodes the symbols of the data signals into a bit stream that is directed to the client device 115 (not shown in FIG. 3). Module 346A may be specialized to only decode modulation format A signals, and module 346B may be specialized to only decode modulation format B signals. Alternatively, modules 345A, 346A, 345B, and 346B may be configurable to decode any modulation format.

Figure 4:
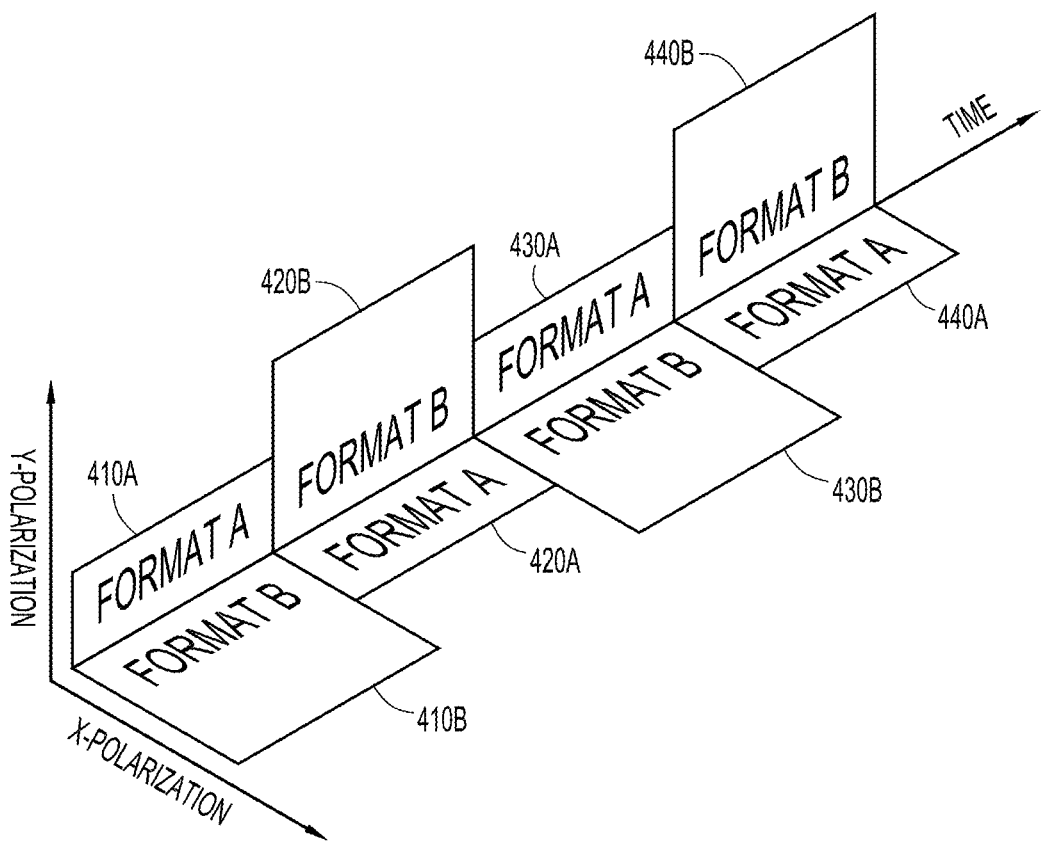
FIG. 4 is a diagram illustrating an example embodiment of interleaving two different modulation formats across two polarization modes.

Referring now to FIG. 4, an example of polarization interleaving (PI) is shown. The graph shows the power levels of modulation format A segments 410A, 420A, 430A, and 440A and the power levels of format B segments 410B, 420B, 430B, and 440B. The power levels are represented as the height of the box representing each respective segment. Each segment may contain a specified number of symbols in the specified modulation format, and depending on the desired BpS of the hybrid format, the number of symbols in each segment may be different for each modulation format. For example, segments 410A, 420A, 430A, and 440A may contain sixteen symbols of QPSK modulated data, while segments 410B, 420B, 430B, and 440B may contain eight symbols of 16-QAM modulated data. In an example in which the number of symbols varies between the different formats, the lengths of the boxes representing segments 410A, 420A, 430A, and 440A may by shorter or longer than the lengths of the boxes representing segments 410B, 420B, 430B, and 440B. Since QPSK modulated data requires less power than 16-QAM modulated data, the height of the boxes representing segments 410A, 420A, 430A, and 440A is smaller than the height of the boxes representing segments 410B, 420B, 430B, and 440B.

In addition to being interleaved along the time dimension, which allows the BpS to be customized, the segments are also interleaved across the x-polarization and y-polarization dimensions. In this example, while segment 410A is being transmitted in modulation format A with y-polarization, segment 410B is being transmitted in modulation format B with x-polarization. After segments 410A and 410B are transmitted, segment 420A is transmitted in format A with x-polarization, and segment 420B is transmitted in modulation format B with y-polarization. Interleaving the data signals across time and polarization maintains the power level at a more constant level, while still maintaining the ability to optimize the BpS and SE of the transmission.

In another example, the energy of the transmission may be smoothed out by introducing an extra component of chromatic dispersion into the signals to create a pre-distorted signal. Since the chromatic dispersion from the optical path 130 is well removed with CD filter 141 in the receiver, no changes are necessary for the receiver to acceptably remove the pre-distortion. The pre-distortion has the effect of smearing the symbols of modulation format A and modulation format B across each other to maintain a more uniform power level across the entire transmission. In one example, the pre-distortion is added by a Fast Fourier Transform (FFT) based finite impulse generator. The FFT based finite impulse generator may function by taking the FFT of a number (N) of samples of the time domain input signal, multiplying the FFT by the complex vector rotation:

$$H(\omega) = \exp\left(-j\frac{Dz\lambda_0^2}{4\pi c}\omega^2\right), \quad (1)$$

and taking the inverse FFT to recover a time domain signal. In one example, subsequent sets of samples may overlap previous sets of samples to overcome cyclic properties. If a subsequent set overlaps a previous set by n−1 samples, then those n−1 samples are discarded after the inverse FFT. In one example the finite impulse response is limited to a bandwidth surrounding the frequency of the optical transmission.

Figure 5A:
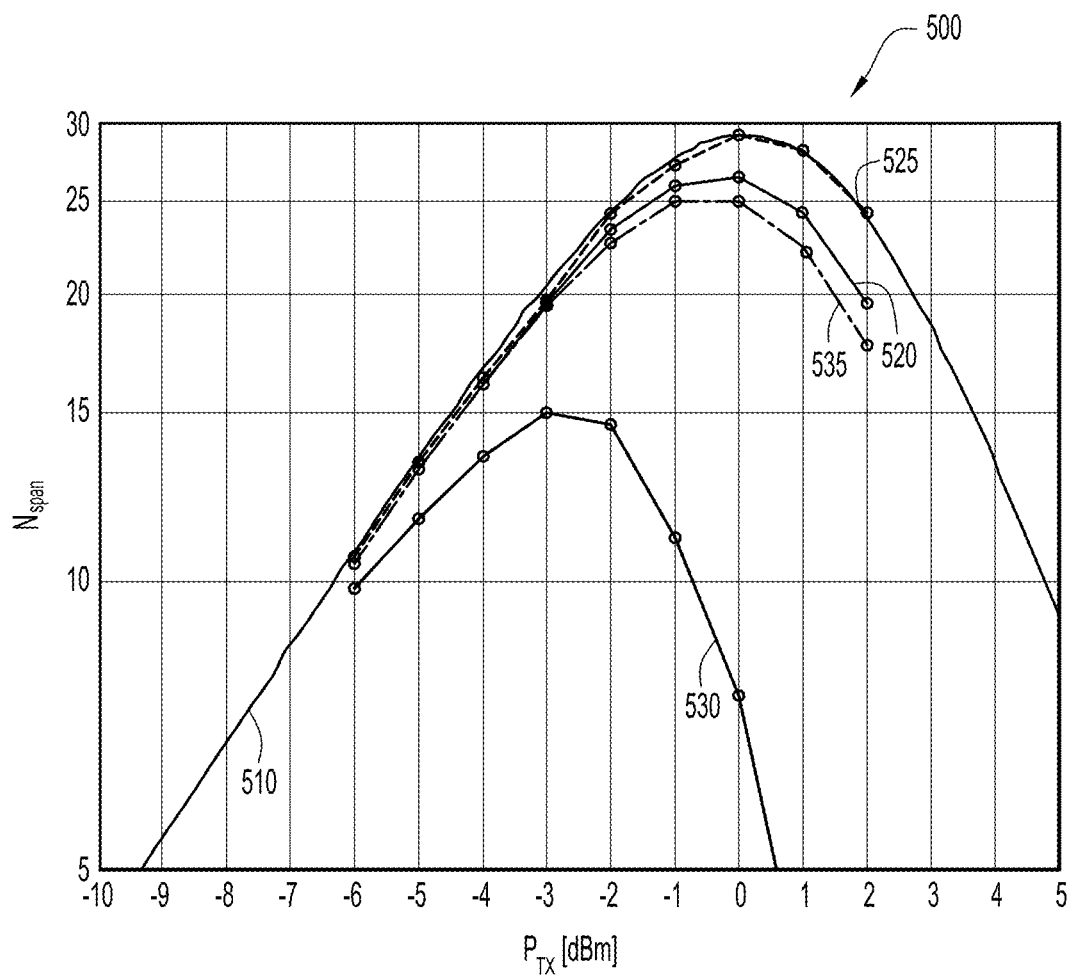
FIG. 5A is a graph showing the increased performance of a transmission using pre-distortion according to an example embodiment presented herein.

Referring now to FIG. 5A, graph 500 shows optical length (as a number of spans) as a function of transmitted power, illustrating the improvement with added chromatic dispersion that can be imposed by the pre-distortion filter 126 of the transmitter 120 shown in FIGS. 1 and 2. Graph 500 shows the performance of two different simulated hybrid transmissions, each simulated with and without pre-distortion, as well as a non-linear model of the theoretical limit 510 which causes the maximum reach of the transmission (i.e., the maximum of the curve) to be limited by nonlinear distortion. In the non-linear theoretical model, for uncompensated links, the non-linear distortion may be approximated as an additive Gaussian noise. The extra noise from the non-linearity, when added with the optical noise added by optical amplifiers, limits the maximum reach across the optical link, as shown by the maximum in plot 510. Plot 520 shows the performance of a hybrid transmission with one symbol of QPSK modulated data interleaved with one symbol of 16-QAM modulated data. Plot 525 shows the performance of a pre-distorted hybrid transmission with one symbol of QPSK data interleaved with one symbol of 16-QAM, with the pre-distortion comprising an added chromatic dispersion of 50,000 ps/nm. Plot 530 shows the performance of a hybrid transmission with 256 symbols of QPSK data interleaved with 256 symbols of 16-QAM data. Plot 535 shows the performance of a pre-distorted hybrid transmission with 256 symbols of QPSK data interleaved with 256 symbols of 16-QAM data, with the pre-distortion comprising an added chromatic dispersion of 50,000 ps/nm. In the example shown in FIG. 5A, there is no polarization interleaving in any of the transmissions. As seen by comparing the maximum of the plots/curves 520 and 525, the maximum reach improves almost to the theoretical limit when pre-distortion is added to a basic hybrid format interleaving one symbol of QPSK data with one symbol of 16-QAM data. As seen by comparing the maximum of the curves 530 and 535, the improvement is even more dramatic as the number of interleaved symbols increases.

Figure 5B:
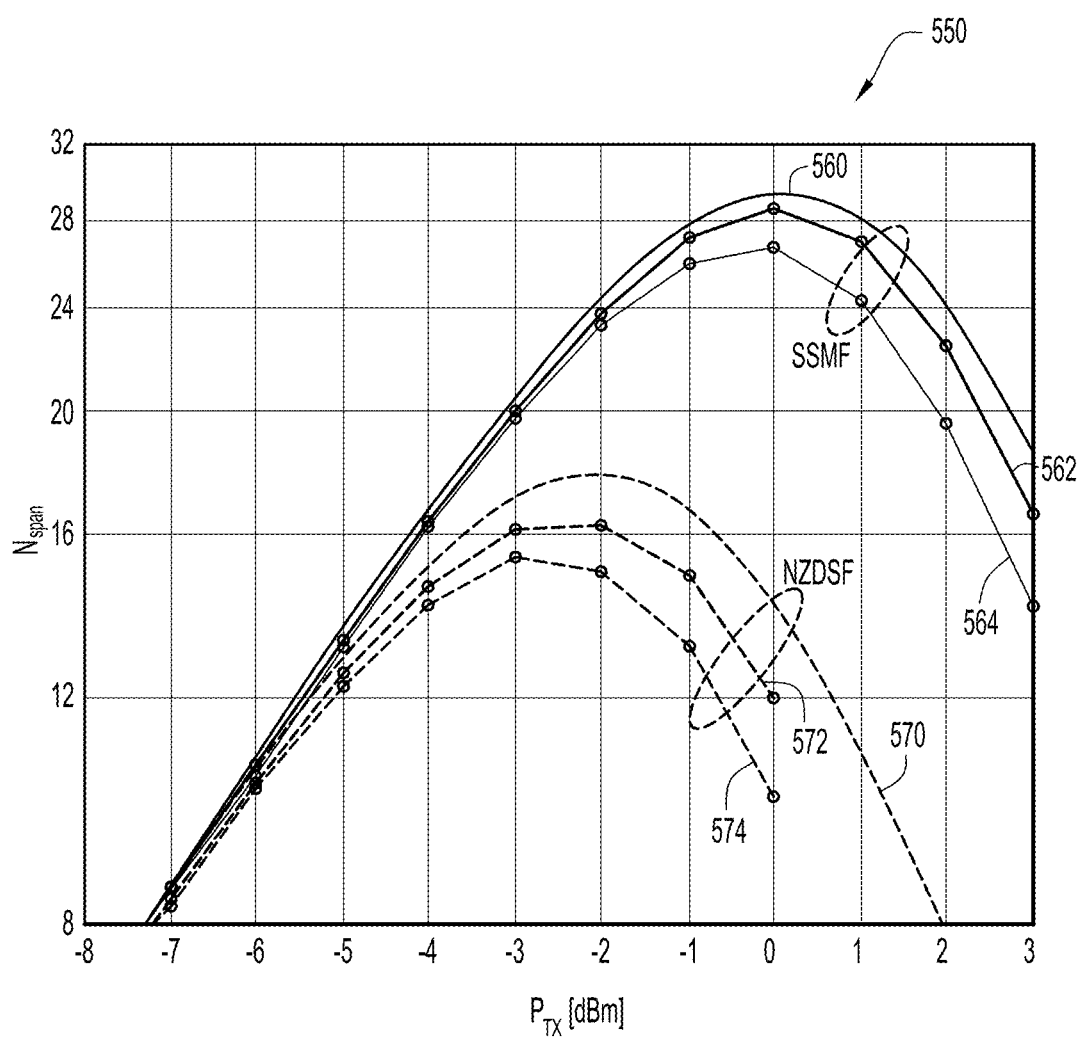
FIG. 5B is a graph showing the increased performance with polarization interleaving according to an example embodiment presented herein.

Referring now to FIG. 5B, graph 550 shows optical length as a function of transmitted power, illustrating the improvement with polarization interleaving. Graph 550 shows the performance of simulated hybrid transmissions through two different optical fibers both with and without polarization interleaving (PI), as well as the theoretical limit for reference. Plot 560 shows the performance of the theoretical limit of the hybrid transmission through a Standard Single Mode Fiber (SSMF). Plots 562 and 564 show the performance of a simulated hybrid transmission, through the SSMF, of two symbols of QPSK modulated data interleaved with two symbols of 16QAM modulated data. Plot 564 shows the baseline performance with no PI, and plot 562 shows the improved performance with PI. Plot 570 shows the performance of the theoretical limit of the hybrid transmission through a Non-Zero Dispersion-Shifted Fiber (NZDSF). Plots 572 and 574 show the performance of a simulated hybrid transmission, through the NZDSF, of two symbols of QPSK modulated data interleaved with two symbols of 16-QAM modulated data. Plot 574 shows the baseline performance with no PI, and plot 572 shows the improved performance with PI.

Figure 6:
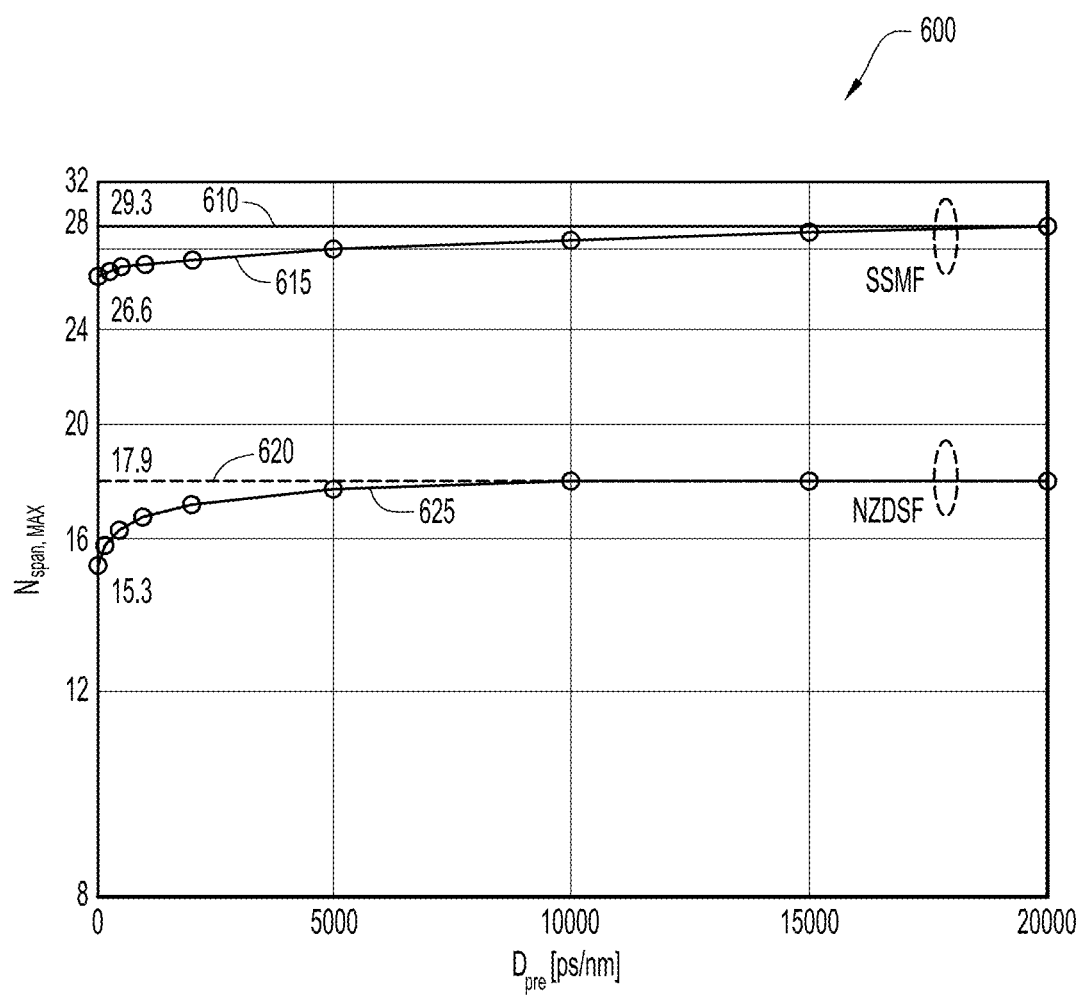
FIG. 6 is a graph showing the effect of different amounts of pre-distortion on the maximum reach of the transmission system according to an example.

Referring now to FIG. 6, graph 600 shows how the maximum reach of a transmission varies as a function of the amount of pre-distortion added to the transmission through two different types of fiber. Plot 610 shows the theoretical limit of the maximum reach for a transmission through a SSMF. Plot 615 shows the performance of a simulated hybrid transmission, through a SSMF, with two symbols of QPSK modulated data interleaved with two symbols of 16-QAM modulated data as the amount of pre-distortion is raised. Plot 620 shows the theoretical limit of the maximum reach for a transmission through an NZDSF. Plot 625 shows the performance of a simulated hybrid transmission, through an NZDSF, with two symbols of QPSK modulated data interleaved with two symbols of 16-QAM modulated data as the amount of pre-distortion is raised.

Figure 7:
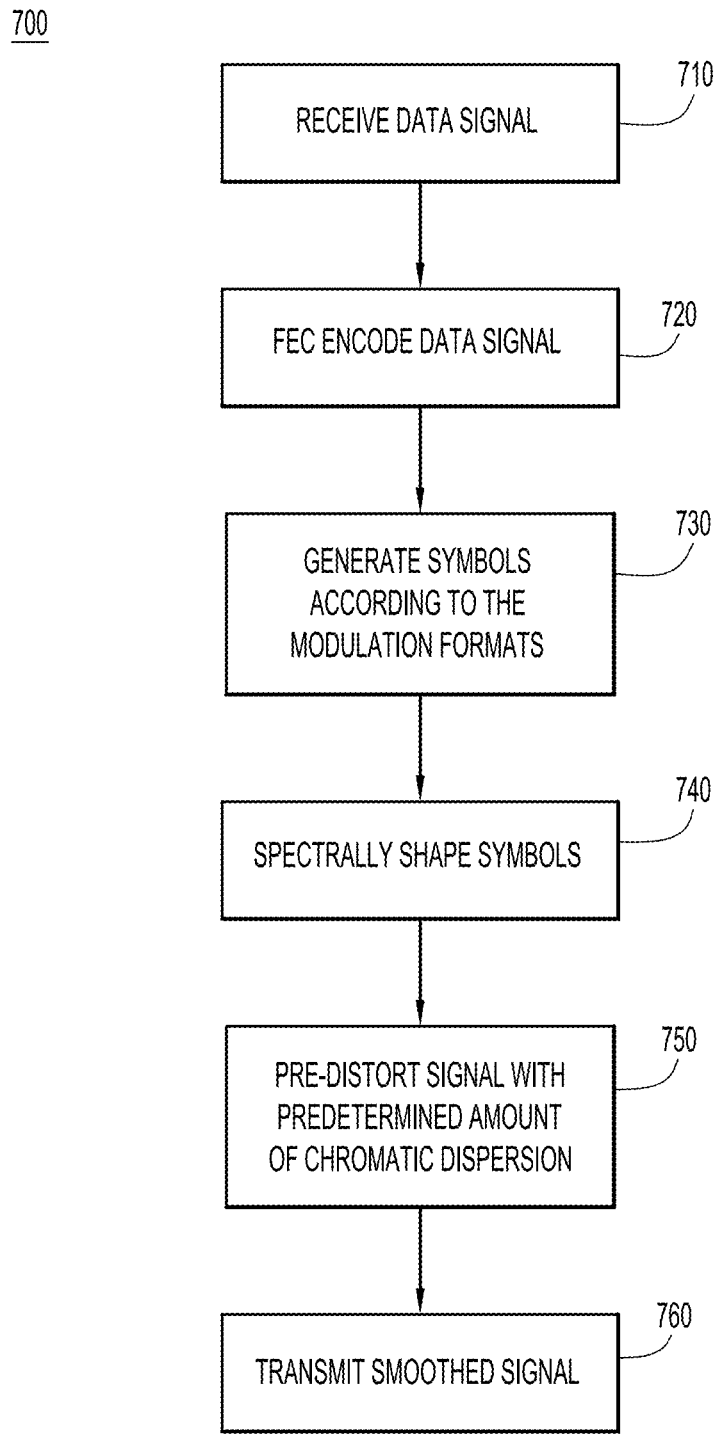
FIG. 7 is a flowchart of an example method for generating a pre-distorted signal according to the techniques presented herein.

Referring now to FIG. 7, a flowchart of an example process 700 for adding pre-distortion to an optical transmission is shown. In step 710, transmitter 120 receives a data signal. The transmitter 120 encodes the data signal with forward error correction (FEC) according to a plurality of modulation formats in step 720. In step 730, the transmitter 120 modulates the data by generating symbols according to a plurality of modulation formats. Transmitter 120 spectrally shapes the modulated data in step 740 to generate a shaped signal. Before transmitting the shaped signal, the transmitter 120 adds a predetermined amount of chromatic dispersion to the modulated data at step 750. The additional chromatic dispersion spreads the pulses such that the energy of each bit is spread over several bit slots, and acts to spread out the power of a hybrid transmission over time more uniformly. In one example, the additional chromatic dispersion is added by a finite impulse response (FIR) filter. In step 760, the transmitter 120 transmits the pre-distorted signal with a smoother power distribution.

In one example, the techniques presented herein provide for a method comprising receiving a data signal from an interface, and encoding the data signal with a forward error correcting (FEC) encoder according to a plurality of modulation formats to generate an FEC encoded signal. A plurality of symbols are generated from the FEC encoded signal according to the plurality of modulation formats, and the plurality of symbols are spectrally shaped to generate a shaped signal. The shaped signal is pre-distorted by adding a predetermined amount of chromatic dispersion to generate a smoothed signal. The smoothed signal is transmitted according to the plurality of modulation formats.

In another example, the techniques presented herein provide for an apparatus with an interface configured to receive a data signal. The apparatus also includes at least one FEC encoder configured to encode the data signal according to a plurality of modulation formats and to generate at least one FEC encoded signal. A symbol generator is configured to generate a plurality of symbols from the at least one FEC encoded signal according to the plurality of modulation formats, and a pulse shaping filter is provided that is configured to spectrally shape the plurality of symbols into a shaped signal. A pre-distortion filter is configured to add a predetermined amount of chromatic dispersion to the shaped signal and generate a smoothed signal. The apparatus also includes an optical transmitter configured to transmit the smoothed signal according to the plurality of modulation formats.

In a further example, the techniques presented herein provide for a receiver comprising a chromatic dispersion filter configured to compensate for any chromatic dispersion in an optical signal received from a transmitter across an optical path. The total chromatic dispersion as seen by the receiver may include a predetermined amount of chromatic dispersion added by the transmitter and a non-predetermined amount of chromatic dispersion from the optical path. The receiver further comprises a frequency offset recovery module configured to recover a carrier frequency of the optical signal and an adaptive polarization filter configured to demultiplex the optical signal, compensate for any polarization mode dispersion (PMD) in the optical signal, and generate an equalized signal. The receiver includes at least one carrier phase estimator configured to estimate the carrier phase of the equalized signal according to a plurality of modulation formats. The receiver also includes at least one FEC decoder configured to decode the equalized signal at the estimated carrier frequency according to the plurality of modulation formats.

In yet another example, the techniques provided herein provide for an apparatus that includes an interface configured to receive a first data signal and a second data signal. The apparatus also includes a first FEC encoder configured to encode the first data signal according to a first modulation format and to generate a first FEC encoded signal, and a second FEC encoder configured to encode the second data signal according to a second modulation format and to generate a second FEC encoded signal. The apparatus further comprises a first symbol generator configured to generate a first plurality of symbols from the first FEC encoded signal according to the first modulation format, and a second symbol generator configured to generate a second plurality of symbols from the second FEC encoded signal according to the second modulation format. The apparatus includes a symbol interleaver configured to alternate at least one of the first plurality of symbols with at least one of the second plurality of symbols and generate a first interleaved signal and second interleaved signal. That apparatus further includes an optical transmitter configured to transmit the first interleaved signal with a first polarization and the second interleaved signal with a second polarization.

In still another example, the techniques provided herein provide for an apparatus that includes a chromatic dispersion filter configured to compensate for any chromatic dispersion in an optical signal from an optical path. The optical signal comprises a first signal at a first polarization and a second signal at a second polarization. The apparatus also includes a frequency offset recovery module configured to recover a carrier frequency of the optical signal. The apparatus further comprises an adaptive polarization filter configured to demultiplex the optical signal, compensate for any polarization mode dispersion (PMD) in the first signal and the second signal, and generate a first equalized signal and a second equalized signal. The first equalized signal and the second equalized signal each include a plurality of symbols in a first modulation format interleaved with a plurality of symbols in a second modulation format. The apparatus includes a symbol de-interleaver configured to separate the first plurality of symbols from the second plurality of symbols out of the first equalized signal and the second equalized signal. The symbol de-interleaver is configured to generate a third equalized signal comprising the first plurality of symbols and a fourth equalized signal comprising the second plurality of symbols. The apparatus also comprises a first carrier phase estimator configured to estimate the carrier phase of the third equalized signal according to the first modulation format, and a second carrier phase estimator configured to estimate the carrier phase of the fourth equalized signal according to the second modulation format. The apparatus further comprises a first FEC decoder configured to decode the third equalized signal at the estimated carrier frequency according to the first modulation format, and a second FEC decoder configured to decode the fourth equalized signal at the estimated frequency according to the second modulation format.

In summary, the techniques provided herein provide for interleaving symbols from different modulation formats in both time and polarization to decrease non-linear distortion that limits the maximum reach of coherent optical transmissions. The transmitter and receiver described herein with an interleaver/de-interleaver module provides a simple architecture, since the remaining modules are not required to recognize and handle different modulation formats and may be designed to process a single modulation format. Additionally, pre-distortion of a hybrid format signal may be used to improve non-linear tolerance.

The above description is intended by way of example only. Various modifications and structural changes may be made therein without departing from the scope of the concepts described herein and within the scope and range of equivalents of the claims.

What is claimed is:

1. A method comprising:
    receiving a data signal from an interface;
    encoding and modulating the data signal with a Forward Error Correcting (FEC) encoder and according to a first modulation format and a second modulation format to generate an FEC encoded signal;
    generating, from the FEC encoded signal, a first plurality of symbols according to the first modulation format and a second plurality of symbols according the second modulation format;
    interleaving the first plurality of symbols with the second plurality of symbols across time and optical polarization, such that, during a first time period, at least one of the first plurality of symbols is transmitted with a first polarization and at least one of the second plurality of symbols is transmitted with a second polarization, and, during a second time period, at least one of the first plurality of symbols is transmitted with the second polarization and at least one of the second plurality of symbols is transmitted with the first polarization;
    spectrally shaping the first and second plurality of symbols to generate, respectively, a first shaped signal and a second shaped signal;

pre-distorting the first and second shaped signals by adding a predetermined amount of chromatic dispersion to generate, respectively, a first smoothed signal and a second smoothed signal; and
optically transmitting the first and second smoothed signals.

2. The method of claim 1, wherein the first and second modulation formats comprise Quadrature Amplitude Modulation (QAM) or Phase Shift Keying (PSK).

3. The method of claim 1, wherein the first and second time periods are consecutive and repeat for a duration of transmission.

4. The method of claim 1, wherein the first plurality of symbols and second plurality of symbols are interleaved with an unequal ratio.

5. An apparatus comprising:
an interface configured to receive a data signal;
at least one Forward Error Correcting (FEC) encoder configured to FEC encode and modulate the data signal according to a first modulation format and a second modulation format and generate first and second FEC encoded signals;
at least one symbol generator configured to generate from the first and second FEC encoded signals a first plurality of symbols according to the first modulation format and the second plurality of symbols encoded according the second modulation format;
an interleaver configured to interleave the first plurality of symbols with the second plurality of symbols across time and optical polarization, such that, during a first time period, at least one of the first plurality of symbols is transmitted with a first polarization and at least one of the second plurality of symbols is transmitted with a second polarization, and, during a second time period, at least one of the first plurality of symbols is transmitted with the second polarization and at least one of the second plurality of symbols is transmitted with the first polarization;
a pulse shaping filter configured to spectrally shape the interleaved first and second plurality of symbols and generate, respectively, a first shaped signal and a second shaped signal;
a pre-distortion filter configured to add a predetermined amount of chromatic dispersion to the first and second shaped signals and generate, respectively, a first smoothed signal and a second smoothed signal; and
an optical transmitter configured to transmit the first and second smoothed signals.

6. The apparatus of claim 5, wherein the at least one FEC encoder comprises a quadrature amplitude modulation (QAM) encoder configured to encode the data signal with forward error correction compatible with QAM, and a phase shift keying (PSK) encoder configured to encode the data signal with forward error correction compatible with PSK, the QAM encoder generating a QAM FEC encoded signal and the PSK encoder generating a PSK FEC encoded signal.

7. The apparatus of claim 6, wherein the at least one symbol generator comprises a QAM symbol generator and a PSK symbol generator, the QAM symbol generator configured to generate a plurality of QAM symbols from the QAM FEC encoded signal, and the PSK symbol generator configured to generate a plurality of PSK symbols from the PSK FEC encoded signal.

8. The apparatus of claim 5, wherein the pulse shaping filter is configured to generate a first polarized signal with at least one of the first or second pluralities of symbols, and generate a second polarized signal with at least another one of the plurality of symbols, and wherein the optical transmitter is configured to transmit the first polarized signal with the first polarization, and transmit the second polarized signal with the second polarization.

9. The apparatus of claim 5, wherein the interleaver is configured to interleave the first plurality of symbols and the second plurality of symbols with an unequal ratio.

10. An apparatus comprising:
an interface configured to receive a first data signal and a second data signal;
a first Forward Error Correcting (FEC) encoder configured to FEC encode and modulate the first data signal according to a first modulation format and generate a first FEC encoded signal;
a second FEC encoder configured to FEC encode and modulate the second data signal according to a second modulation format and generate a second FEC encoded signal;
a first symbol generator configured to generate a first plurality of symbols from the first FEC encoded signal according to the first modulation format;
a second symbol generator configured to generate a second plurality of symbols from the second FEC encoded signal according to the second modulation format;
a symbol interleaver configured to interleave the first plurality of symbols with the second plurality of symbols across time and optical polarization, such that, during a first time period, at least one of the first plurality of symbols is transmitted with a first polarization and at least one of the second plurality of symbols is transmitted with a second polarization, and, during a second time period, at least one of the first plurality of symbols is transmitted with the second polarization and at least one of the second plurality of symbols is transmitted with the first polarization;
an optical transmitter configured to transmit the interleaved first plurality of symbols and second plurality of symbols.

11. The apparatus of claim 10, wherein the first encoder is configured to encode only according to the first modulation format, the second encoder is configured to encode only according to the second modulation format, the first symbol generator is configured to generate symbols only according to the first modulation format, and the second symbol generator is configured to generate symbols only according to the second modulation format.

12. A method comprising:
receiving a first data signal and a second data signal;
encoding and modulating the first data signal with a first Forward Error Correcting (FEC) encoder according to a first modulation format to generate a first FEC encoded signal;
encoding and modulating the second data signal with a second FEC encoder according to a second modulation format to generate a second FEC encoded signal;
generating a first plurality of symbols from the first FEC encoded signal according to the first modulation format;
generating a second plurality of symbols from the second FEC encoded signal according to the second modulation format;
interleaving the first plurality of symbols with the second plurality of symbols across time and optical polarization, such that, during a first time period, at least one of the first plurality of symbols is transmitted with a first optical polarization and at least one of the second plurality of symbols is transmitted with a second optical polarization, and, during a second time period, at least one of the first plurality of symbols is transmitted with the second polarization and at least one of the second plurality of symbols is transmitted with the first polarization; and transmitting the interleaved first plurality of symbols and second plurality of symbols.

13. The method of claim 12, wherein the first FEC encoder is configured to encode only according to the first modulation format, and wherein the second FEC encoder is configured to encode only according to the second modulation formation.

14. One or more non-transitory computer readable storage media encoded with software comprising computer executable instructions and when the software is executed operable to cause a processor to:

receive a data signal from an interface;

forward error correction (FEC) encode and modulate the data signal according to a first modulation format and a second modulation format to generate an FEC encoded signal;

generate from the FEC encoded signal a first plurality of symbols encoded according to the first modulation format and a second plurality of symbols encoded according the a second modulation format;

interleave the first plurality of symbols with the second plurality of symbols across time and optical polarization, such that, during a first time period, at least one of the first plurality of symbols is transmitted with a first polarization and at least one of the second plurality of symbols is transmitted with a second polarization, and, during a second time period, at least one of the first plurality of symbols is transmitted with the first polarization and at least one of the second plurality of symbols is transmitted with the first polarization;

spectrally shape the first and second plurality of symbols to generate, respectively, a first shaped signal and a second shaped signal;

pre-distort the first and second shaped signals by adding a predetermined amount of chromatic dispersion to the first and the second shaped signals to generate, respectively, a first smoothed signal and a second smoothed signal; and cause the first smoothed signal and the second smoothed to be optically transmitted.

15. The computer readable storage media of claim 14, wherein the first and second modulation formats comprise Quadrature Amplitude Modulation (QAM) or Phase Shift Keying (PSK).

16. The computer readable storage media of claim 14, wherein the first plurality of symbols and the second plurality of symbols are interleaved with an unequal ratio.

17. The apparatus of claim 5, wherein the first and second time periods are consecutive and repeat for a duration of transmission.

18. The apparatus of claim 10, wherein the first and second time periods repeat for a duration of transmission.

19. The apparatus of claim 10, wherein the first and second time periods are consecutive.

20. The method of claim 12, wherein the first and second time periods are consecutive and repeat for a duration of transmission.

21. The computer readable storage media of claim 14, wherein the first and second time periods repeat for a duration of transmission.

22. The computer readable storage media of claim 14, wherein the first and second time periods are consecutive.

\* \* \* \* \*